United States Patent [19]

Mismas

[11] Patent Number: 5,628,384
[45] Date of Patent: May 13, 1997

[54] MODULAR FILTER SECTION FOR PROGRESSIVE DIVIDER VALVE

[75] Inventor: James R. Mismas, Concord Township, Ohio

[73] Assignee: Lubriquip, Inc., Cleveland, Ohio

[21] Appl. No.: 637,216

[22] Filed: Apr. 24, 1996

[51] Int. Cl.$^6$ .................................................. F16N 27/00
[52] U.S. Cl. .................................... 184/7.4; 184/6.24
[58] Field of Search ........................... 184/7.4, 8, 9, 10, 184/6.24

[56] References Cited

U.S. PATENT DOCUMENTS

| | | |
|---|---|---|
| 1,990,986 | 2/1935 | Fox . |
| 3,145,803 | 8/1964 | Cobert . |
| 3,715,013 | 2/1973 | Lyth et al. . |
| 3,926,279 | 12/1975 | Thrasher ................................ 184/7.4 |
| 4,955,953 | 9/1990 | Kayser . |
| 5,074,381 | 12/1991 | Minard et al. . |
| 5,126,722 | 6/1992 | Kamis ..................................... 184/7.4 |

Primary Examiner—Thomas E. Denion
Attorney, Agent, or Firm—Hill, Steadman & Simpson

[57] ABSTRACT

A filter for use in a distributor valve arrangement, the filter having a filter base block having an identical dimension with feeder base blocks and bolted thereto in a stacked arrangement. The filter can be located at an inlet end of the distributor valve or placed in sequence at any position within the stacked arrangement for special filtering applications. The filter has a filter block mounted to the filter base block, which has a bore therein for receiving a cylindrical screen element which is held in by an external screwed plug. On an opposite side of the filter block is provided a screwed bore for applying an indicator to sense differential pressure across the filter element to detect a clogged filter.

18 Claims, 3 Drawing Sheets

MODULAR FILTER SECTION FOR PROGRESSIVE DIVIDER VALVE

BACKGROUND OF THE INVENTION

The present invention relates to lubrication progressive divider valves and particularly to a modular filter section for a lubrication progressive divider valve assembly. Lubrication progressive divider valves are hydraulically controlled lube oil distributors for injecting small amounts of lubrication sequentially to plural lubrication destinations such as parts to a single machine or multiple machines. A lubrication distributor valve is disclosed for example in U.S. Pat. No. 4,312,425; 5,480,004; and 4,572,331. According to the embodiments disclosed in these patents, a modular design is employed for manufacturing flexibility to provide delivered lubrication for multiple users wherein the number of users can be changed easily by adding or subtracting valve modules. Each valve module is separated into a base block and a spool block, connected by bolts. The modules are connected in series with end modules being specialized. At one end is an inlet module and at the other end is a closure module.

In current practice, an in-line filter is installed in the tubing upstream of the lubrication progressive divider valve. This filter treats or cleans the lubricant being supplied to the divider valve. This filter is a potential source of leaks as it is jointed into the piping and is costly to provide and install due to the fact that it is a separately connected item.

SUMMARY OF THE INVENTION

It is an object of the invention to provide a modular filter for use in a lubrication progressive divider valve which is easily installed, provides for effective maintenance of the filter and the divider valve, and is sized to be installable at numerous potential places in a series stack of valve modules to allow the filter to be easily removed from the equipment without violating the integrity of the lubrication system, i.e., without introducing air and other containments into the system.

It is an object of the invention to provide a filter component which can use a maximum of standard parts without adding any unnecessary machining operations.

It is an object of the invention to provide a filter assembly using the same center line and base dimensions as the valve modules. It is an object of the invention to provide a "filter clogged" indication option which triggers at a preselected pressure differential across the filter. It is an object of the invention to provide that the filter indication option can be readily changed out by replacing the particular spring of the mechanism. It is an object of the invention to provide a filter design which includes a start up mode and a normal operational mode; the start up mode being used during initial purge of the system and allowing a quick change out for normal operational mode. It is an object of the invention to provide an overall system which requires the modular filter to be installed before putting the lubrication progressive divider valve into service.

The objects of the invention are achieved by replacing the prior known separate in-line filter assembly with a modular filter to be installed in series with the valve modules as part of an entire modular divider valve assembly. Standard components can be used including a compatible, special base plate aligned in series with standard base plates for the valve modules. The filter is configured to be installable at any position along a stack of valve modules so that special services can have different filtering capabilities. Multiple module filters can be used in a divider valve assembly.

The filter is configured to have an easily replaceable filter element. During initial purge of the system, a fine filter can be used and thereafter changed to a more coarse filter for actual production. The start up filter can be color coded. Thus, if the system is dismantled, the presence of the start up fine filter after prolonged operation would indicate to the manufacturer whether the user has properly followed the start up and purge procedures.

The filter can be made tamper-proof and require the removal of the entire section for servicing. The system can be arranged to only be operable if there is a replacement filter installed. This arrangement eliminates the possibility of the lubrication system being run without the proper filtration in place. In one embodiment, the base section of the filter can be integral with an inlet section for the distributor valve.

The invention provides a stacked configuration of valve modules made up of spool blocks and base blocks with a modular arrangement of a filter having its own filter base sized to match with and connect to the base blocks. The filter provides a filter block with a convenient plug closure for replacing cylindrical filter elements. Additionally, an indicator is provided for determining the pressure drop across the filter element, for ascertaining when to change out the filter element. The indicator uses a spring loaded sensing piston within a bore, in the filter block, wherein the bore has a first port communicating with an inlet side of the filter element and a second port communicating with an outlet side of the filter element, said first and second ports flow connected by channels to opposite sides of the sensing piston. Against spring pressure, the piston is shifted in accordance with the differential pressure on opposite sides of the piston. A sensor is screwed into the filter block and is responsive to the position of the sensing piston to communicate visually or electronically to the user. The sensor can use a magnet to sense the position of the sensing piston, the magnet moved by the sensing piston and providing a magnetic signal to an outside of an otherwise sealed sensor. The signal can be a visual indication at the sensor or an electric signal received by control or monitoring equipment.

DETAILED DESCRIPTION OF THE PREFERRED EMBODIMENTS

Figure 1:
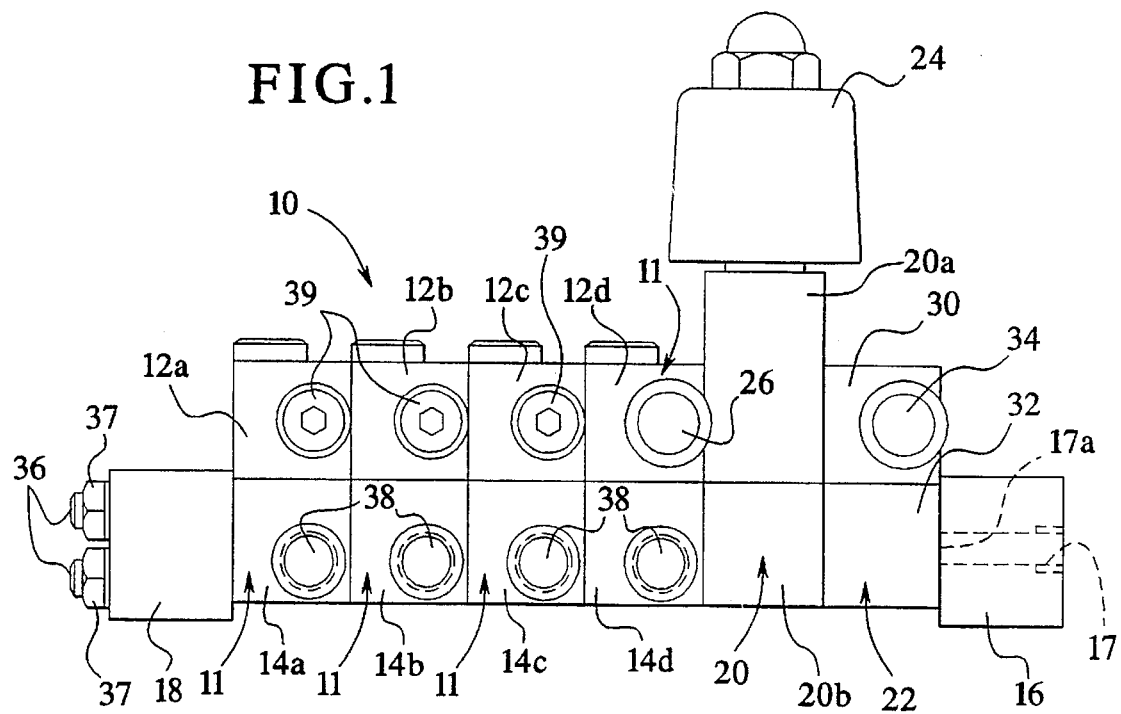
FIG. 1 is an elevational view of a distributor valve of the present invention.

FIG. 1 illustrates a divider valve assembly 10 having valve modules 11 having spool blocks 12a, 12b, 12c, 12d mounted respectively to base blocks 14a, 14b, 14c, 14d. The spool blocks and base blocks communicate to each other through vertical channels and to adjacent base blocks in series as described in for example U.S. Pat. Nos. 4,312,425; 5,480,004; and 4,572,331. An inlet section 16 having an inlet port 17, and a closure section 18 are arranged on opposite ends of the base blocks 14a–14d. Between the inlet section 16 and the spool block 12d together with the base block 14d is a shut off valve module 20 and a filter assembly 22. The shut off block assembly 20 uses a solenoid actuator 24. The shut off valve 20 comprises a manifold block 20a fastened onto a shut off base block 20b. The manifold block houses the valve element and valve seat (not shown).

An indicator instrument 26 is provided in at least one of the spool blocks, in this case spool block 12d. This indicator instrument 26 senses movement of a reciprocating distributor spool (not shown) within the spool block 12d to monitor proper reciprocating operation.

The filter assembly 22 comprises a filter block 30 mounted onto a filter base block 32. The filter block 30 and the filter base block 32 approximate the size of the spool blocks 12a–12d and the base blocks 14a–14d. This is advantageous for tooling and configuration compatibility.

Figure 3:
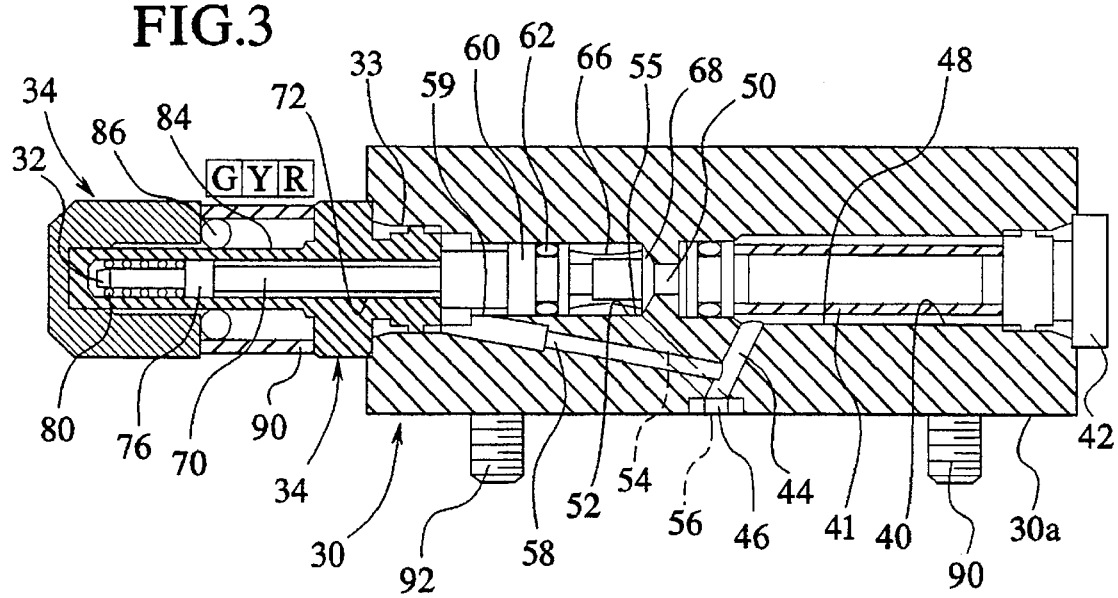
FIG. 3 is a sectional view of a filter block assembly taken generally along line III—III from FIG. 2.

Mounted at one end of the filter block 30 into an opening 33 (shown in FIG. 3) is a indicator instrument 34, the function of which will be described hereinafter.

The base blocks 14a–14d and the spool blocks 12a–12d of each valve module 11 are held together by bolts 35. The inlet section 16 and the closure section 18, with the valve modules 11, filter assembly 22 and shut off valve module 20 between, are held together by threaded rods or bolts 36. Each bolt extends through each of the closure section 18, shut off valve module 20, filter assembly 22 valve base blocks 14a–14d, and into the inlet section 16. The bolts are either threaded into the inlet section 16 or otherwise secured therein, such as by cap screw heads, and fastened by nuts 37 at the closure section 18. The bolts 36 are received within and through bores of each of the elements which are all in registry.

The divider valve assembly 10 of FIG. 1 is a completely modular assembly with each of the inlet section 16, end section 18, valve modules 11, filter assembly 22, shut off valve module 20 being removable separately. Additionally, the spool blocks 12a–12d and base blocks 14a–14d are separable for service by unfastening the bolts 35. Also, as described below, a filter element is separable from the filter block 30 and filter base block 32. Each spool block has a bore extending the entire width thereof, in which a valve spool (not shown) is disposed and is movable by hydraulic actuation to selectively distribute lubricant in a sequence via an output port 38 in each of the base blocks 14a–14d. After the spools are placed in the spool blocks 12a–12d, the opening of the bores are closed by a threaded plug 39, to create a chamber for lateral sliding of the spools.

Each of the valve modules formed by base block and spool block is substantially identical. Each base block and spool block has a plurality of vertical non-communicating passages therein (not shown), which are in registry when the spool block is fastened down onto the base block. Dependent on the position of the spool within the bore as a result of hydraulic actuation, one or more of these passages is placed in fluid communication with a passage extending the length of the distributor valve assembly 10, which is, in turn, in fluid communication with the inlet port 17. Lubricant entering the valve assembly via the inlet port 17 is thereby directed in a sequence out of each output port 38, dependent on the respective positions of the spool in the bores of each spool block 12a–12d.

Figure 4:
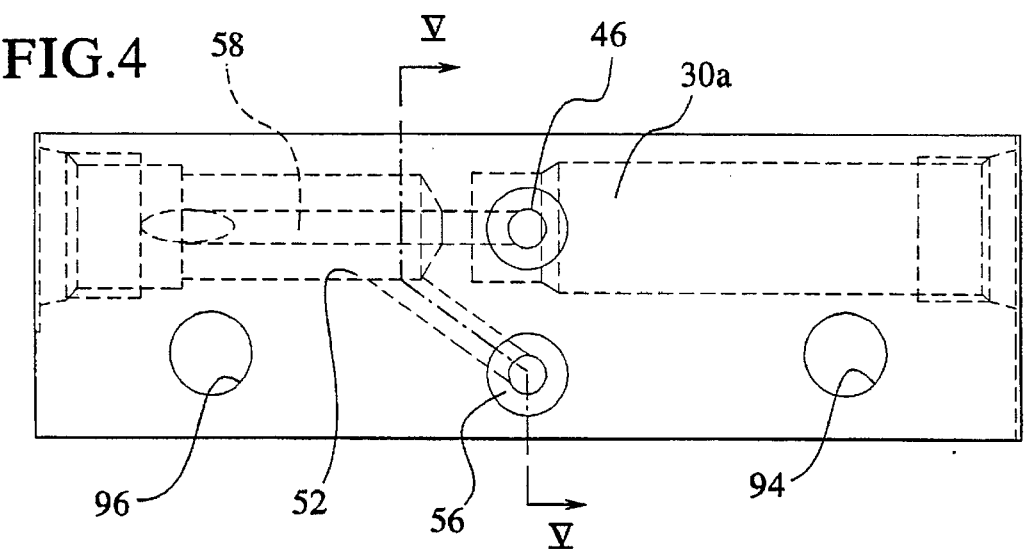
FIG. 4 is a bottom view of the filter block assembly of FIG. 3, unassembled and without the indicator.

FIG. 4 illustrates the inner components of the filter block 30. The filter block 30 comprises a first bore 40 which holds therein a cylindrical filtering element 41, held in by a plug 42 screwed into the filter block 30. An inlet line 44 proceeds from an oil inlet 46 into an annular space 48 surrounding the screen element 41. The first bore 40 communicates through a channel 50 into a second bore 52. The first bore 40, channel 50 and second bore 52 are; aligned axially. An oil outlet line 54 proceeds from a first position 55 in the second bore 52 to an outlet 56. The inlet 46 and the outlet 56 are arranged spaced apart on a bottom face 30a of the filter block 30. A differential pressure line 58 proceeds from the inlet line 44 to a second position 59 open to the second bore 52. In the second bore 52 arranged between the first position 55 and the second position 59 is a piston 60. The piston 60 includes an O-ring 62 for sealing against the bore 52. A balance spring 66 is provided between the piston 60 and a front wall 68 of the bore 52. Thus, against the influence of the spring 66, the piston 60 moves within the bore 52 in accordance with the differential pressure sensed by the outlet line 54 and the differential pressure line 58 which senses the inlet pressure.

Figure 9:
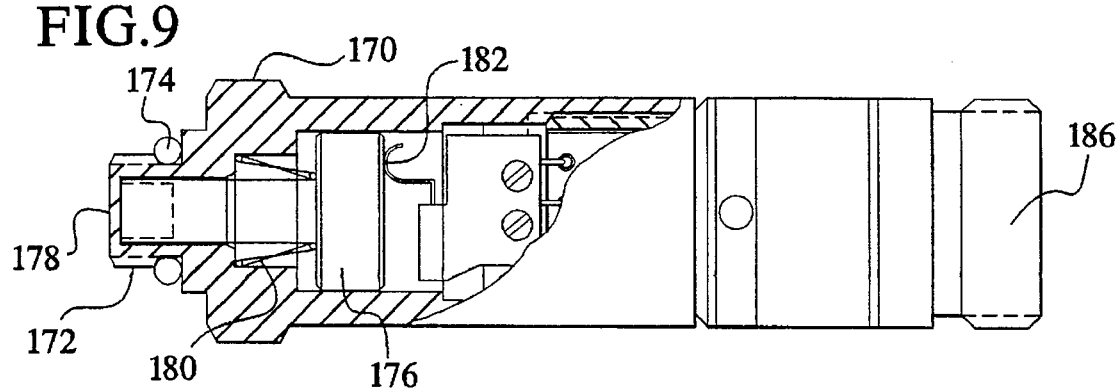
FIG. 9 is an elevational view, partly in section, of an indicator instrument.

The indicator instrument 34 includes a magnet 70 reciprocal within a bore 72 aligned with the piston 60. The magnet includes a collar 76 upon which a spring 80 acts against the back wall 82 of the sensor 34 to bias the magnet 70 toward a forward position. Thus, approach and contact the piston 60 would thrust the magnet to the left in the figure. Surrounding a cylinder 84 for housing the magnet 70 is arranged a plurality of metal balls 86 held in an annular channel by a transparent housing cover 90. As the magnet moves toward the left, for example, magnetic force pulls the balls to move with the magnet. As shown in the figure, the balls are fully thrust to the left. This would indicate a high differential pressure between the inlet and the outlet, indicating a clogged filter element 41 other type indicator instruments known to the art would also be used. Alternately, as shown in FIG. 9, and described below, a proximity switch can be used to electronically monitor the position of a magnet.

Figure 5:
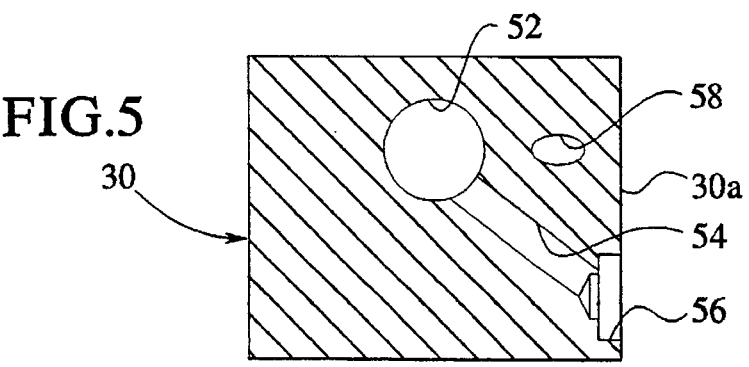
FIG. 5 is a sectional view taken generally along line V—V of FIG. 4.

Screws or bolts 90, 92 are provided to attach the filter block 30 to the filter base block 32. The screws 90, 92 are interfit within through bores 94, 96 shown in FIG. 5 which can be countersunk to receive a cap screw.

Figure 2:
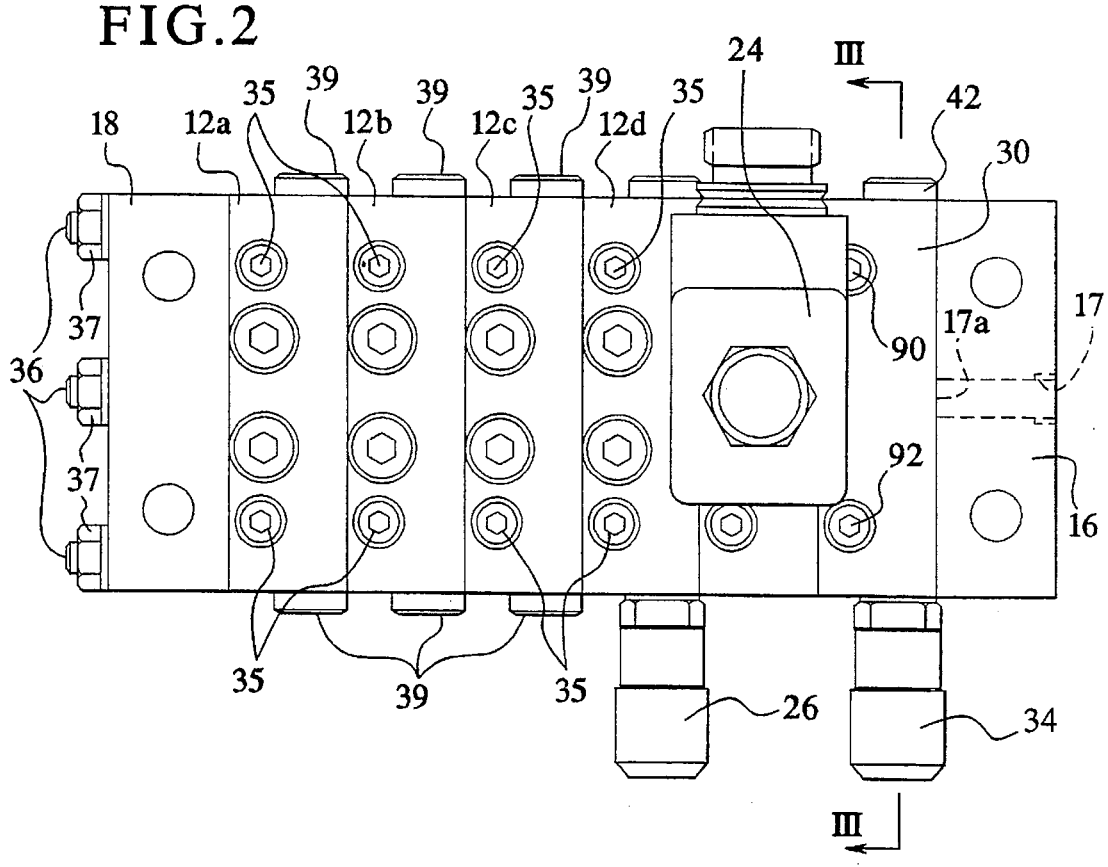
FIG. 2 is a top plan view of the distributor valve of FIG. 1.
Figure 6:
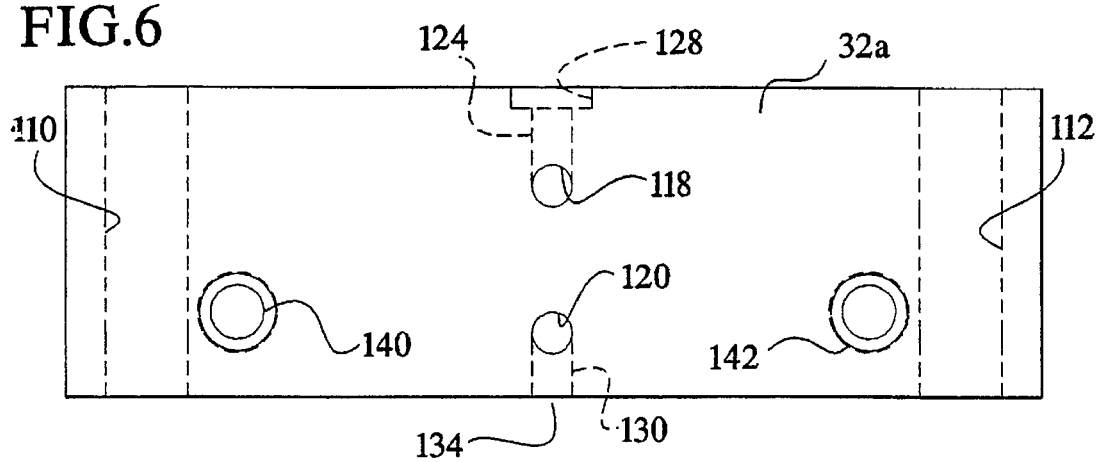
FIG. 6 is a top plan view of a filter base block.
Figure 7:
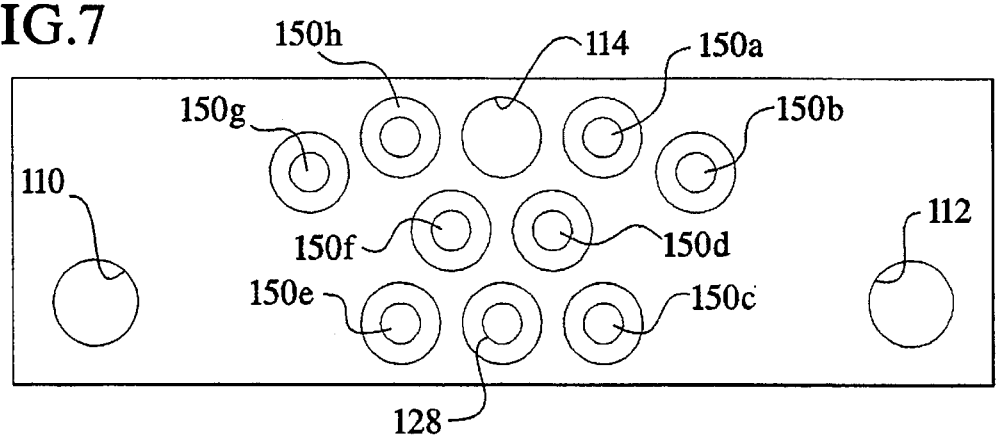
FIG. 7 is a right side elevational view of the base block of FIG. 6.
Figure 8:
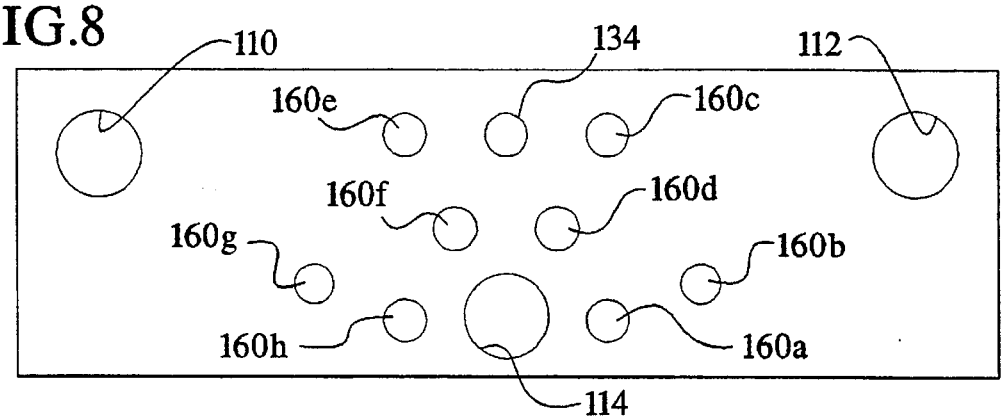
FIG. 8 is a left side elevational view of the base block of FIG. 6.

FIGS. 6–8 illustrate in isolation the filter base block 32 having bores 110, 112, 114 for receiving the bolts or threaded rods 36 for assembling the filter module 22 into the distributor valve 10. On a top surface 32a are located a lubricant delivery port 118 which delivers lubricant to the inlet 46 of the filter block 30 when the filter block surface 30a is flushly mated to the base block surface 32a. Also, a lubricant receiving port 120 is arranged to register with the lubricant outlet 56 on the surface 30a. The lubricant delivery port 118 is connected by a first L-shaped channel 124 to a lubricant: inlet 128. The lubricant inlet 128 is provided with a socket for receiving an O-ring or resilient grommet to seal against an outlet port 17a of the block inlet section 16 (shown in FIGS. 1 and 2). The outlet port 17a is connected by a channel 17b to the inlet port 17.

The receiving port 120 is connected by a second L-shaped channel 130 to a lubrication outlet 134 which communicates lubricant to an adjacent base block, to the shut off valve module 20.

Bolt bores 140, 142 are shown which are threaded to receive the bolts 90, 92 respectively to fasten the filter block 30 to the base block 32 at flush surfaces 30a, 32a. Seal O-rings or resilient grommets can be used to seal all registering ports which channel lubricant.

A number of additional ports 150a–150h are shown in FIG. 7 which are connected by straight through bores to further ports 160a–160h respectively on an opposite side of the block shown in FIG. 8. The additional ports 150a–150h are provided with sockets for receiving O-ring seal. The channels defined between the additional ports 150a–150h and further ports 160a–160h are provided for lubricant distribution in base blocks throughout the distributor valve, and longitudinal channels can be combined or modified by cross porting. A more detailed description can be found in U.S. Pat. Nos. 4,312,425; 5,480,004; and 4,572,331; herein incorporated by reference.

To increase similarity of ports for manufacturing economy and inventory reduction, it is advantageous that the base block 32 is an identical part to the valve base block 20b.

As a further exemplary embodiment (not shown), the filter base block and inlet section 16 can be combined into a compact, unitary inlet block which would provide the inlet port 17 and the thread or nut means to engage the threaded rods 36 to hold the distributor valve 10 together.

FIG. 9 shows a proximity switch 170 which can be screwed into the filter block bore 52, in lieu of the indicator 34. The switch includes a lead end 172 with an O-ring 174 for screwing into the opening 33. A magnet assembly 176 moves under magnetic influence of the piston 60 (shown in FIG. 3) through a front wall 178 against influence of a spring 180 to trigger a switch arm 182. A cable connector 186 is connected by cable (not shown) to an electronic monitor.

Other type proximity switches can be used such as those which sense in some way the magnetic field of an approaching or retreating magnetic position element.

Although the present invention has been described with reference to a specific embodiment, those of skill in the art will recognize that changes may be made thereto without departing from the scope and spirit of the invention as set forth in the appended claims.

I claim as my invention:

1. A distributor valve for distributing lubrication to multiple lubrication users, comprising:

a plurality of feeder blocks, each having a reciprocating piston for reciprocation to deliver a quantity of lubricating oil to a lubrication user, said feeder blocks arranged in a stacked arrangement attached together; and a filter block attached to said plurality of feeder blocks at a position in the stacked arrangement, said filter block comprising a bore therein closed by an external plug, and a filter element fit within said bore and contained therein by said plug, said filter block having an inlet for receiving lubricating oil and an outlet for communication of that lubricating oil into a next adjacent one of said plurality of feeder blocks, and said filter element arranged between said inlet and outlet.

2. The distributor valve according to claim 1, wherein said filter element comprises a cylindrical filter and said inlet communicates lubricating oil into an annular space between said bore and said filter element, and said outlet receives flow from inside said filter element.

3. The distributor valve according to claim 1, wherein said filter block further comprises:

a second bore axially arranged in flow communication with said first bore;

an outlet channel connected to said outlet and said second bore at a first position;

a differential pressure channel connected two said inlet and to said second bore at a second position;

an indicator piston arranged between said first position and said second position in said second bore and influenced by the differential pressure between said inlet and said outlet to move within said second bore; and an indicator element connected to said indicator piston and protruding out of said second bore to provide a signal to an operator indicating the differential pressure across said filter element.

4. The distributor valve according to claim 3, wherein said indicator element comprises a magnet, and further comprising an indicator housing surrounding said magnet, and a spring for biasing said magnet out of said housing and into said second bore; and a plurality of metallic targets arranged adjacent said magnet and free to move axially with said magnet to indicate a position of said magnet.

5. The distributor valve according to claim 3, wherein said indicator element comprises a magnet which moves with said indicator piston, and a means to sense the position of said magnet.

6. The distributor valve according to claim 1, wherein said filter block comprises a filter base which comprises the same length and height dimensions as an adjacent base of said feeder block.

7. The distributor valve according to claim 1, further comprising:

a plurality of base blocks one each underlying a respective feeder block, said base blocks comprising channels therein for connection to lubrication users and for sequential flow connection to a respective adjacent base block; and a filter base block connected to said filter block and having channels therein for connection to said inlet and to said outlet and distributor channels for transferring flow from said outlet to the next adjacent feeder base block.

8. The distributor valve according to claim 7, wherein said filter base block comprises equal length and height as said feeder base blocks.

9. A filter for use in a modular lubrication distributor valve, the distribution valve having a plurality of stacked feeder blocks, each flow connected to a lubrication user and having means for directing a preselected amount of lubrication to the user, comprising:

a filter block mounted to said plurality of filter blocks at a position along said stack of feeder blocks, said filter block comprising a bore therein closed by an external plug, and a filter element fit within said bore and held therein by said plug, said filter block having an inlet for receiving lubricating oil and an outlet for communication of that lubricating oil into said plurality of feeder blocks, and said filter element arranged between said inlet and outlet.

10. The filter according to claim 9, wherein said filter element comprises a cylindrical filter in said inlet communicates lubricating oil into an annular space between said bore and said filter element, and said outlet receives flow from inside said filter element.

11. The filter according to claim 9, further comprising:

a second bore axially arranged and in flow communication with said first bore;

an outlet channel connected to said outlet and said second bore at a first position;

a differential pressure channel connected to said inlet and to said second bore at a second position;

an indicator piston arranged between said first position and said second position in said second bore and influenced by the differential pressure between said inlet and said outlet to move within said second bore; and an indicator element connected to said indicator piston and protruding out of said second bore to provide a signal to an operator indicating the differential pressure across said filter element.

12. The filter according to claim 11, wherein said indicator element comprises a magnet and further comprising an indicator housing surrounding said magnet, and a spring for biasing said magnet out of said housing and into said second bore; and a plurality of metallic targets arranged adjacent said magnet and free to move axially with said magnet to visually indicate a position of said magnetic.

13. The filter according to claim 9, wherein said filter block comprises a filter base which has the same length and height dimensions as one of said feeder blocks.

14. The filter according to claim 9, further comprising a filter base block connected to said filter block and connectable to an adjacent feeder block and having channels therein for connection to said inlet and to said outlet and distributor channels for transferring flow from said outlet to the adjacent feeder block.

15. The filter according to claim 14, wherein said filter base block and filter block together comprise an equal length and height as said feeder blocks.

16. A modular filter for use in a series progressive distributor valve for lubricating machinery, the distributor valve having a plurality of stacked feeder modules each having a feeder block mounted on a base block, the feeder block having a flow regulating valve therein and the base blocks having an inlet and an outlet for tube connection to a lubrication user, comprising:

a filter block having a replaceable filter element therein and a first channel means for delivering lubricating oil through said element;

a filter base block having an inlet and an outlet, said inlet connected to a source of lubricating oil, said outlet connected to an inlet of a next adjacent feeder base block, and second channel means for connecting said inlet to said outlet via said first channel means, said filter block removable from said filler base block, said filter base block fastened to said adjacent feeder base block.

17. The modular filter according to claim 16, wherein said filter block comprises a closure element for retaining said filter element within said filter block, said closure element removable to replace said filter element.

18. The modular filter according to claim 16, wherein said filter base block and said feeder base block are the same size.

* * * * *